US012689212B2

(12) United States Patent
Lin et al.

(10) Patent No.: US 12,689,212 B2
(45) Date of Patent: Jul. 21, 2026

(54) SERVER SYSTEM AND POWER MANAGEMENT METHOD THEREOF

(71) Applicant: Wiwynn Corporation, New Taipei City (TW)

(72) Inventors: Wen Chan Lin, New Taipei City (TW); Yuan Sheng Lee, New Taipei City (TW)

(73) Assignee: Wiwynn Corporation, New Taipei City (TW)

( * ) Notice: Subject to any disclaimer, the term of this patent is extended or adjusted under 35 U.S.C. 154(b) by 190 days.

(21) Appl. No.: 18/653,987

(22) Filed: May 3, 2024

(65) Prior Publication Data

US 2025/0167547 A1 May 22, 2025

(30) Foreign Application Priority Data

Nov. 17, 2023 (TW) ................................. 112144535

(51) Int. Cl.
H02J 1/10 (2006.01)

(52) U.S. Cl.
CPC ..................................... H02J 1/106 (2020.01)

(58) Field of Classification Search
CPC ............. H02J 1/106; G06F 1/30; G06F 1/263
USPC ......................................................... 307/44
See application file for complete search history.

(56) References Cited

U.S. PATENT DOCUMENTS

| | | | | |
|---|---|---|---|---|
| 2010/0164292 A1* | 7/2010 | Freeman | .................. | G06F 1/263 |
| | | | | 307/80 |
| 2010/0264741 A1* | 10/2010 | Togare | .................. | G06F 1/3206 |
| | | | | 307/80 |

| | | | |
|---|---|---|---|
| 2011/0205769 A1 | 8/2011 | Blackwell et al. | |
| 2015/0177805 A1 | 6/2015 | Yeh et al. | |
| 2016/0011650 A1 | 1/2016 | Yang et al. | |
| 2016/0282892 A1 | 9/2016 | Saavedra et al. | |
| 2018/0299937 A1 | 10/2018 | Nguyen et al. | |

FOREIGN PATENT DOCUMENTS

| | | |
|---|---|---|
| EP | 3659009 | 4/2023 |
| TW | 202138961 | 10/2021 |
| WO | 2010094170 | 8/2010 |

OTHER PUBLICATIONS

"Office Action of Taiwan Counterpart Application", issued on Dec. 12, 2024, p. 1-p. 9.
"Search Report of Europe Counterpart Application", issued on Mar. 20, 2025, p. 1-p. 10.

* cited by examiner

*Primary Examiner* — Richard Tan

(74) *Attorney, Agent, or Firm* — JCIPRNET

(57) ABSTRACT

Disclosed are a server system and a power management method thereof. The power management method includes: in a backup mode, making a first power supply that is a master power supply to receive a power setting value and limiting a first output power value of the master power supply to be no greater than a power setting value; and in the backup mode, making a second power supply that is a slave power supply to be activated, and controlling an output power of the slave power supply to be a second output power value, wherein the second output power value is set according to a difference between a total load of the power supply device and the first output power value.

22 Claims, 7 Drawing Sheets

Figure 1:
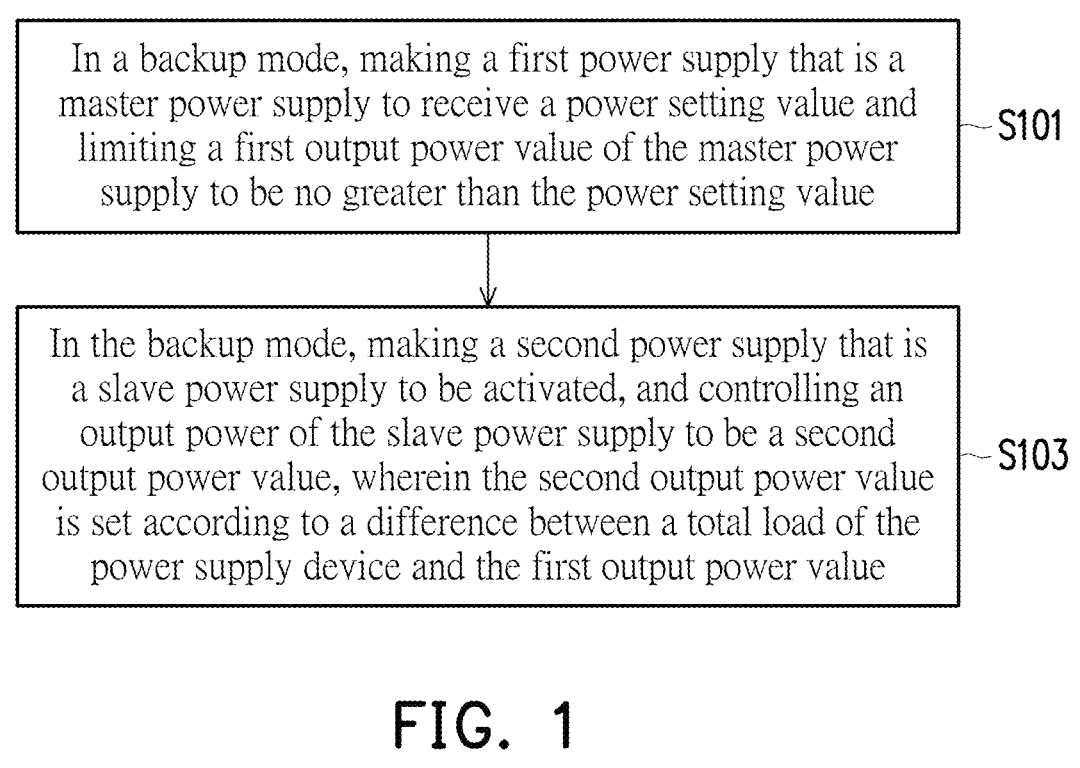

In a backup mode, making a first power supply that is a master power supply to receive a power setting value and limiting a first output power value of the master power supply to be no greater than the power setting value ~S101

In the backup mode, making a second power supply that is a slave power supply to be activated, and controlling an output power of the slave power supply to be a second output power value, wherein the second output power value is set according to a difference between a total load of the power supply device and the first output power value ~S103

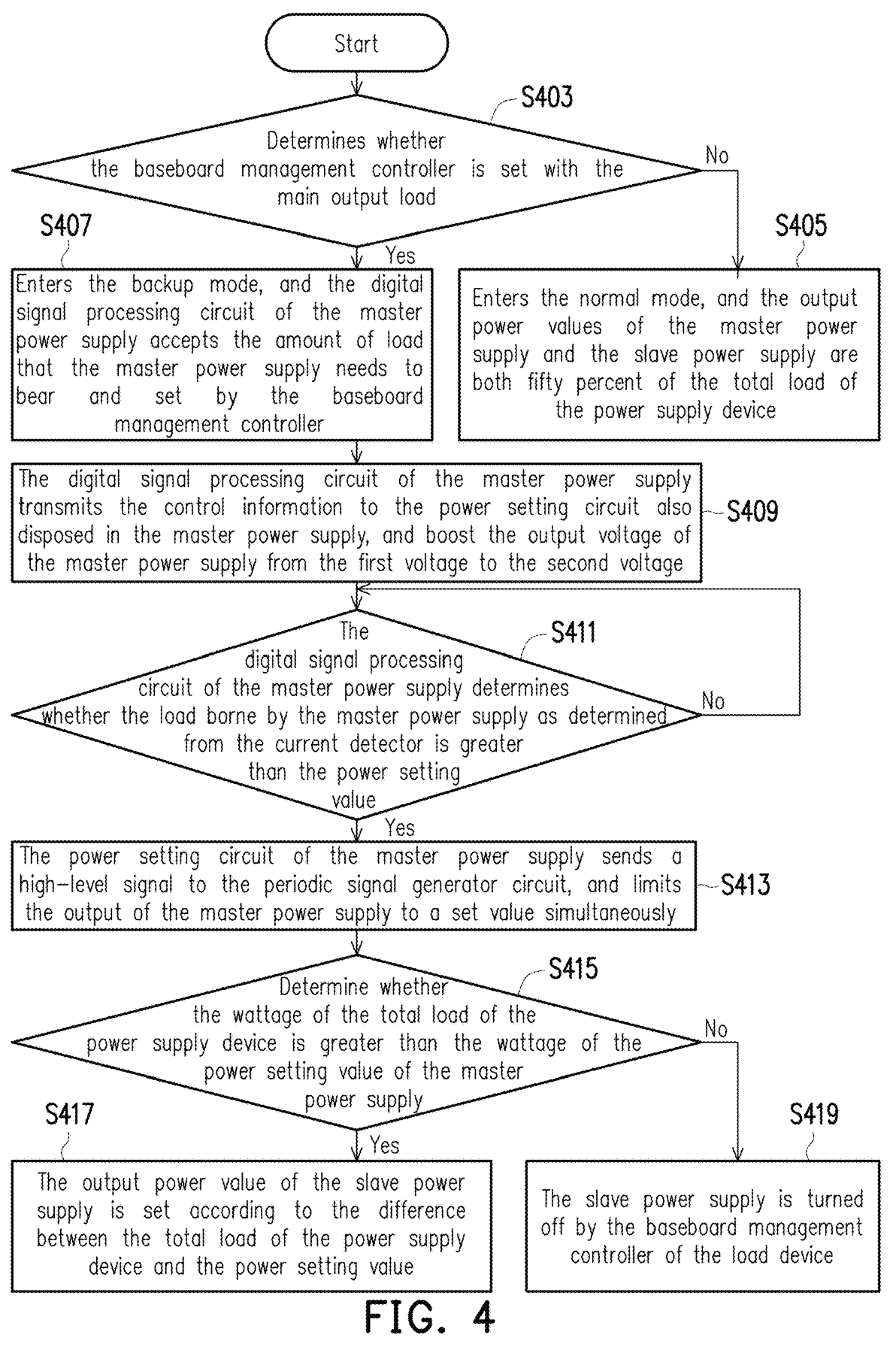

Start

S403

Determines whether the baseboard management controller is set with the main output load No

S405

Enters the normal mode, and the output power values of the master power supply and the slave power supply are both fifty percent of the total load of the power supply device Yes

S407

Enters the backup mode, and the digital signal processing circuit of the master power supply accepts the amount of load that the master power supply needs to bear and set by the baseboard management controller

S409

The digital signal processing circuit of the master power supply transmits the control information to the power setting circuit also disposed in the master power supply, and boost the output voltage of the master power supply from the first voltage to the second voltage

S411

The digital signal processing circuit of the master power supply determines whether the load borne by the master power supply as determined from the current detector is greater than the power setting value No Yes

S413

The power setting circuit of the master power supply sends a high-level signal to the periodic signal generator circuit, and limits the output of the master power supply to a set value simultaneously

S415

Determine whether the wattage of the total load of the power supply device is greater than the wattage of the power setting value of the master power supply No Yes

S417

The output power value of the slave power supply is set according to the difference between the total load of the power supply device and the power setting value

S419

The slave power supply is turned off by the baseboard management controller of the load device

FIG. 4

SERVER SYSTEM AND POWER MANAGEMENT METHOD THEREOF

CROSS-REFERENCE TO RELATED APPLICATION

This application claims the priority benefit of Taiwan application serial no. 112144535, filed on Nov. 17, 2023. The entirety of the above-mentioned patent application is hereby incorporated by reference herein and made a part of this specification.

BACKGROUND

Technical Field

The present disclosure relates to a server system and a power management method thereof, and in particular, to a server system having a master power supply and a slave power supply and a power management method thereof.

Description of Related Art

In a common power supply mode, two power supply devices are connected in parallel to supply power to a load system. However, in the conventional power supply method, two power supply devices connected in parallel must each bear fifty percent of the total load power, and the output power of the two power supply devices must be the same, otherwise power supply cannot be provided. As a result, there is a lack of options for operation of the power supply device, and which relatively limits the application scope of the power supply device. In light of the above, how to provide a power supply device with multiple operating modes to adapt to different use conditions is an important issue for practitioners in the field.

SUMMARY

The present disclosure provides a server system and a power management method thereof, which may adjust the ratio of output borne by the master power supply and the slave power supply of the server system according to the condition of the power supply device.

A power management method in the disclosure is adaptable for a power supply device, and the method includes: in a backup mode, making a first power supply that is a master power supply to receive a power setting value and limiting a first output power value of the master power supply to be no greater than a power setting value; and in the backup mode, making a second power supply that is a slave power supply to be activated, and controlling an output power of the slave power supply to be a second output power value, wherein the second output power value is set according to a difference between a total load of the power supply device and the first output power value.

The server system of the present disclosure includes a load device and a power supply device. The power supply device is coupled to the load device, and the power supply device includes a first power supply and a second power supply. The first power supply is set as the master power supply. The second power supply is set as a slave power supply and is coupled in parallel with the first power supply. In the backup mode, the load device provides a power setting value to the master power supply. The first output power value provided by the master power supply is not greater than the power setting value. The load device sets the second output power value provided by the power supply device according to the difference between the total load of the power supply device and the first output power value.

The power supply device of the present disclosure includes: a first power supply and a second power supply. The first power supply is set as the master power supply. The second power supply is set as a slave power supply and is coupled in parallel with the first power supply. In the backup mode, the master power supply receives the power setting value, and the first output power value of the master power supply is limited to be no greater than the power setting value, and the output power of the slave power supply is the second output power value, and the second output power value of the slave power supply may be set according to the difference between the total load of the power supply device and the first output power value.

BRIEF DESCRIPTION OF THE DRAWINGS

FIG. 1 is a flow chart of a power management method of a server system according to an embodiment of the present disclosure.

FIG. 4 illustrates an operation flow chart of power management of a server system according to an embodiment of the present disclosure.

DESCRIPTION OF THE EMBODIMENTS

Please refer to FIG. 1. FIG. 1 is a flow chart of a power management method of a server system according to an embodiment of the present disclosure. The server system of this embodiment includes a load device and a power supply device, and the power supply device includes a first power supply and a second power supply coupled in parallel to each other. In step S101, if the server system is in the backup mode, the first power supply serving as the master power supply may receive the power setting value and limit the first output power value of the master power supply to be no greater than the power setting value. In step S103, the server system is also in the backup mode, which enables the second power supply serving as the slave power supply to be activated and controls the output power of the slave power supply to be the second output power value. The second output power value is set according to the difference between the total load of the power supply device and the first output power value.

In this embodiment, the power setting value may be a preset value. The power setting value should not be greater than the maximum output power value of the master power supply. In this embodiment, in the backup mode, the output power value of the first power supply serving as the master power supply is not greater than the power setting value. When the total load of the power supply device is not greater than the above-mentioned power setting value, the first power supply is able to bear all the loads, and under this condition, the second power supply serving as the slave power supply does not need to be activated. Correspondingly, when the total load of the power supply device is greater than the above-mentioned power setting value, the output power value of the first power supply device may be equal to the above-mentioned power setting value, and the insufficient load may be borne by the second power supply through activating the second power supply.

Figure 2:
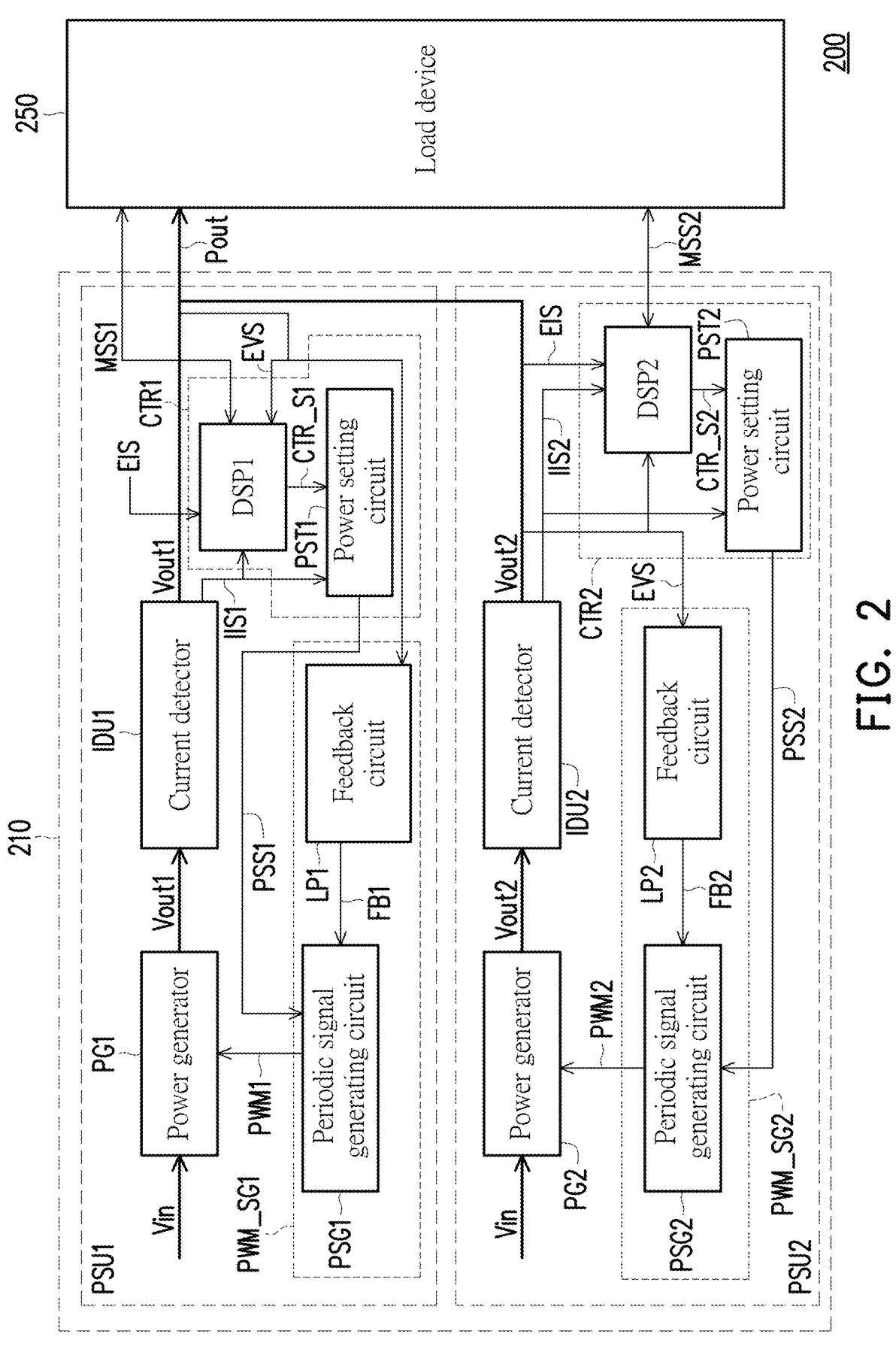
FIG. 2 is a schematic diagram of an internal circuit of a server system according to an embodiment of the present disclosure.

Please refer to FIG. 2. FIG. 2 is a schematic circuit diagram of a server system 200 according to an embodiment of the present disclosure. The server system 200 includes a load device 250 and a power supply device 210. The power supply device 210 is coupled to the load device 250, and the power supply device 210 further includes a power supply PSU1 and a power supply PSU2. The power supply PSU1 and the power supply PSU2 are coupled in parallel to each other, wherein the output terminals of the power supply PSU1 and the power supply PSU2 are commonly coupled to the load device 250.

The power supply PSU1 includes a power generator PG1, a current detector IDU1, a pulse width modulation signal generator PWM_SG1 and a controller CTR1. The pulse width modulation signal generator PWM_SG1 includes a periodic signal generating circuit PSG1 and a feedback circuit LP1. The controller CTR1 includes a digital signal processing circuit DSP1 and a power setting circuit PST1.

The power supply PSU2 includes a power generator PG2, a current detector IDU2, a pulse width modulation signal generator PWM_SG2 and a controller CTR2. The pulse width modulation signal generator PWM_SG2 includes a periodic signal generating circuit PSG2 and a feedback circuit LP2. The controller CTR2 includes a digital signal processing circuit DSP2 and a power setting circuit PST2.

In terms of operation details, the power supply PSU1 may generate the internal output voltage Vout1 and provide the first output power accordingly. The power supply PSU2 may generate the internal output voltage Vout2 and provide the second output power accordingly. The power supply device 210 may generate the total output power Pout and provide the total output power Pout to the load device 250.

In the normal mode of the server system 200, the power supply PSU1 and the power supply PSU2 may both be activated and respectively bear half of the total load required by the load device 250. In this condition, the first output power and the second output power respectively provided by the power supply PSU1 and the power supply PSU2 may be equal and half of the total load required by the load device 250.

In the backup mode of the server system 200, one of the power supplies PSU1 and PSU2 may be set as the master power supply, and the other one may be set as the slave power supply. Taking the power supply PSU1 as the master power supply (the power supply PSU2 as the slave power supply) as an example, the power supply PSU1 may receive a power setting value in advance. When performing the driving operation of the load device 250, the power supply PSU1 determines the first power value to be provided based on the power setting value and the total load required by the load device 250. When the total load required by the load device 250 is not greater than the power setting value, the power supply PSU1 is able to bear all the load of the load device 250, and the power supply PSU2 does not need to be activated under this condition. When the total load required by the load device 250 is greater than the power setting value, the power supply PSU1 only provides the first output power equal to the power setting value. Under this condition, the power supply PSU2 needs to be activated and provide the second output power, wherein the second output power is equal to the total load required by the load device 250 minus the power setting value.

The above-mentioned setting actions of the master and slave power supplies may be performed according to the master-slave selection signals MSS1 and MSS2. The power supplies PSU1 and PSU2 may be set as master or slave power supply according to the master-slave selection signals MSS1 and MSS2 respectively. In this embodiment, the master-slave selection signals MSS1 and MSS2 may be sent by the load device 250. In other embodiments of the present disclosure, the master-slave selection signal MSS1 may be an internal signal of the power supply device 210, or may be sent by a control device outside the power supply device 210, the disclosure is not limited thereto.

In the power supply PSU1, the power generator PG1 may receive the input voltage Vin and output the internal output voltage Vout1 according to the pulse width modulation signal PWM1. The current detector IDU1 may be disposed on the transmission path of the internal output voltage Vout1 to detect the internal current signal IIS1 provided by the internal output voltage Vout1. The current detector IDU1 may transmit the internal current signal IIS1 to the controller CTR1. The digital signal processing circuit DSP1 in the controller CTR1 may receive the internal current signal IIS1, the master-slave selection signal MSS1, the external current signal EIS and the external voltage signal EVS. The controller CTR1 generates control information CTR_S1 based on the internal current signal IIS1, the master-slave selection signal MSS1, the external current signal EIS, and the external voltage signal EVS. The power setting circuit PST1 may receive the control information CTR_S1 and the internal current signal IIS1, and generate the power setting signal PSS1 accordingly.

In addition, the feedback circuit LP1 may receive the external voltage signal EVS and generate the feedback signal FB1 accordingly. The periodic signal generating circuit PSG1 may receive the power setting signal PSS1 from the power setting circuit PST1 of the controller CTR1, receive the feedback signal FB1 from the feedback circuit LP1, and generate a pulse width modulation signal PWM1 according to the power setting signal PSS1 and the feedback signal FB1, and then transmits the pulse width modulation signal PWM1 to the power generator PG1.

In this embodiment, when the power supply PSU1 is set as the master power supply, the digital signal processing circuit DSP1 may acquire the total load required by the load device 250 according to the external current signal EIS and the external voltage signal EVS. Furthermore, the digital signal processing circuit DSP1 may determine whether the total load required by the load device 250 is greater than the power setting value, and generate control information CTR_S1 based on the above determination result. On the other hand, the power setting circuit PST1 may determine the magnitude of the first output power that the power supply PSU1 needs to provide based on the control information CTR_S1 and the internal current signal IIS1, and generate the power setting signal PSS1 accordingly.

The feedback circuit LP1 is disposed to feed back the external voltage signal EVS. The periodic signal generating circuit PSG1 may adjust the frequency and/or duty ratio of the pulse width modulation signal PWM1 according to the power setting signal PSS1 and the feedback signal FB1, and thereby adjust the first output power provided by the power supply PSU1.

In the power supply PSU2, the power generator PG2 may receive the input voltage Vin and output the internal output voltage Vout2 according to the pulse width modulation signal PWM2. The current detector IDU2 may be disposed on the transmission path of the internal output voltage Vout2 to detect the internal current signal IIS2 provided by the internal output voltage Vout2. The current detector IDU2 may transmit the internal current signal IIS2 to the controller CTR2. The digital signal processing circuit DSP2 in the controller CTR2 may receive the internal current signal IIS2, the master-slave selection signal MSS2, the external current signal EIS and the external voltage signal EVS. The controller CTR2 generates control information CTR_S2 based on the internal current signal IIS2, the master-slave selection signal MSS1, the external current signal EIS, and the external voltage signal EVS. The power setting circuit PST2 may receive the control information CTR_S2 and the internal current signal IIS2 to generate the power setting signal PSS2.

In addition, the feedback circuit LP2 may receive the external voltage signal EVS and generate the feedback signal FB2 accordingly. The periodic signal generating circuit PSG2 may receive the power setting signal PSS2 from the power setting circuit PST2 of the controller CTR2, receive the feedback signal FB2 from the feedback circuit LP2, and generate the pulse width modulation signal PWM2 based on the power setting signal PSS2 and the feedback signal FB2, and then transmits the pulse width modulation signal PWM2 to the power generator PG2.

In this embodiment, the digital signal processing circuit DSP2 may acquire the total load required by the load device 250 based on the external current signal EIS and the external voltage signal EVS. The digital signal processing circuit DSP2 may also determine whether the total load required by the load device 250 is greater than the power setting value. When the power supply PSU2 is set as the slave power supply and the total load is greater than the power setting value, the digital signal processing circuit DSP2 may generate the control information CTR_S2. The power setting circuit PST2 may determine the magnitude of the second output power that the power supply PSU2 needs to provide based on the control information CTR_S2 and the internal current signal IIS2, and generate the power setting signal PSS2 accordingly, wherein the magnitude of the second output power is the total load required by the load device 250 minus the power setting value.

The feedback circuit LP2 is disposed to feed back the external voltage signal EVS. The periodic signal generating circuit PSG2 may adjust the frequency and/or duty ratio of the pulse width modulation signal PWM2 according to the power setting signal PSS2 and the feedback signal FB2, and adjust the second output power provided by the power supply PSU2.

It is worth noting that by inputting the internal current signal IIS1 to a buffer (such as an emitter follower) and inputting the internal current signal IIS2 to another buffer, the above two output terminals are coupled to each other, so that the external current signal EIS may be obtained at the output terminal of the buffer.

Figure 3:
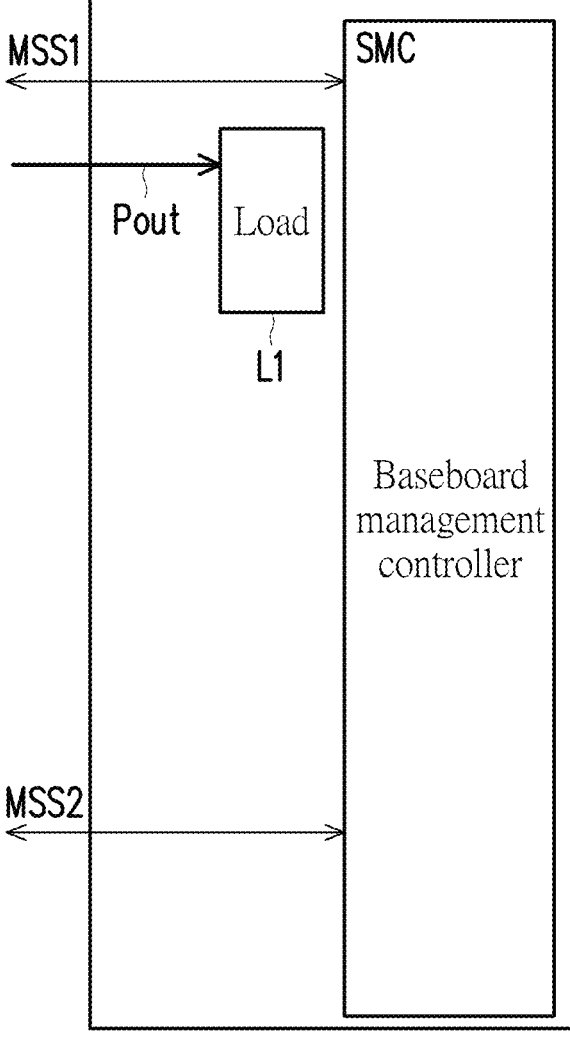
FIG. 3 is a schematic diagram of an internal circuit of a load device of the server system of FIG. 2.

Please refer to FIG. 3. FIG. 3 is a schematic diagram of the internal circuit of the load device 250 of the server system of FIG. 2. The load device 250 includes a load L1 and a baseboard management controller SMC. The load L1 may receive the total output power Pout of the power supply device 210 in FIG. 2. The baseboard management controller SMC may use the master-slave selection signals MSS1 and MSS2 to determine one of the power supply PSU1 and the power supply PSU2 as the master power supply, determine the other as the slave power supply, and send the power setting value to selected master power supply to limit the output power of the master power supply.

Please refer to FIG. 4. FIG. 4 illustrates an operation flow chart of power management of a server system according to an embodiment of the present disclosure. The server system of this embodiment includes a load device and a power supply device. The power supply device further includes a master power supply and a slave power supply. The master power supply and the slave power supply are coupled in parallel to each other. In step S401, the server system starts the power management operation. In step S403, the server system determines whether the baseboard management controller in the load device is set with the main output load; if not, the server system may execute step S405; if yes, the server system may execute step S407.

In step S405, the power supply device enters the normal mode, and the output power values of the master power supply and the slave power supply are both fifty percent of the total load of the power supply device. In step S407, the power supply device enters the backup mode, and the digital signal processing circuit of the master power supply accepts the amount of load that the master power supply needs to bear and set by the baseboard management controller. After executing step S407, the server system then executes step 409. The digital signal processing circuit of the master power supply transmits the control information to the power setting circuit also disposed in the master power supply, and boost the output voltage of the master power supply from the first voltage to the second voltage.

Step S411 is carried out to determine whether the load borne by the master power supply as determined by the digital signal processing circuit of the master power supply from the current detector also in the master power supply is greater than the power setting value provided by the load device; if yes, the server system executes step S413; if not, the server system repeatedly executes step S411.

In step S413, the power setting circuit of the master power supply sends a high-level signal to the periodic signal generating circuit, and limits the output of the master power supply to a set value simultaneously.

In step S415, the server system may determine whether the wattage of the total load of the power supply device is greater than the wattage of the power setting value of the master power supply; if yes, the server system executes step S417; if not, the server system executes step S419.

In step S417, the output power value of the slave power supply is set according to the difference between the total load of the power supply device and the above-mentioned power setting value. In other words, the output power of the slave power supply is equal to the total load minus the remaining power of the maximum power that the master power supply can provide. In step S419, the slave power supply is turned off by the baseboard management controller of the load device.

Figure 5:
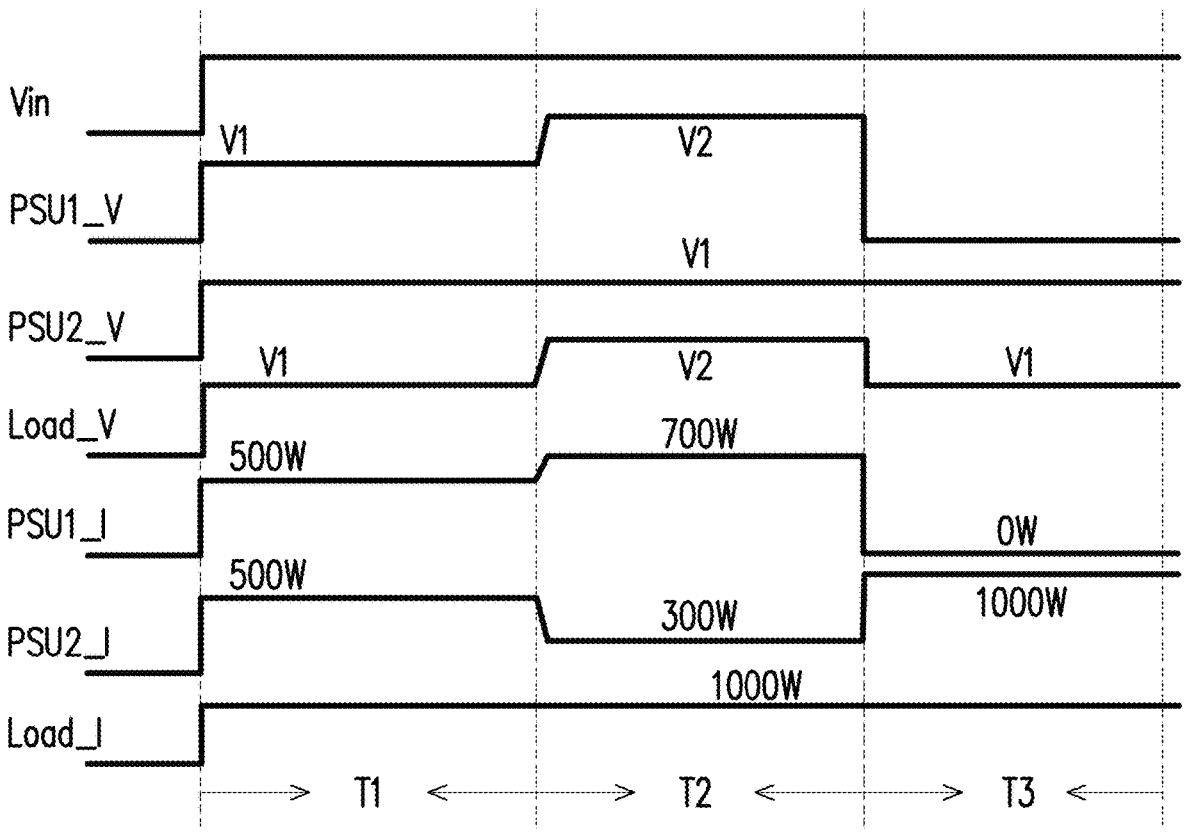
FIG. 5 shows a voltage timing diagram of a power supply of a server system according to an embodiment of the present disclosure.

Please refer to FIG. 5. FIG. 5 is a voltage timing diagram of the power supply of the server system according to an embodiment of the present disclosure. The server system of the embodiment includes a load device and a power supply device, and the power supply device further includes a first power supply and a second power supply.

During the time interval from T1 to T3, the input voltage Vin may be stably maintained at a voltage value. During the time interval T1, the power supply operates in the normal mode. According to the command sent by the load device, the first power supply is set as the master power supply, and the second power supply is set as the slave power supply. The output voltage PSU1_V of the first power supply, the output voltage PSU2_V of the second power supply, and the output voltage Load_V of the power supply device may all be a first voltage value greater than zero. The total load Load_I required by the load device is set to be 1000 watts (W) as an example, under this condition, the output powers PSU1_I and PSU2_I of the first power supply and the second power supply may both be 50% of the total load Load_I, that is 500 W.

During the time interval T2, the power supply device operates in the backup mode. The first power supply boosts the generated output voltage PSU1_V from the first voltage to the second voltage according to the power setting value (which is equal to 700 W, for example). Correspondingly, the output voltage Load_V of the power supply device boosts from the first voltage to the second voltage. The output voltage PSU2_V of the second power supply is maintained at the first voltage. Under the condition that the total load Load_I is maintained at 1000 W, the first output power PSU1_I provided by the first power supply may be adjusted from 500 W to 700 W (which is equal to the power setting value) by boosting the output voltage PSU1_V. The second output power PSU2_I provided by the second power supply is correspondingly reduced to the difference between the total load Load_I and the first output power PSU1_I, that is, 300 W.

During the time interval T3, if the first power supply fails and cannot provide normal output, the output voltage PSU1_V drops to 0V. Under this condition, the first output power PSU1_I provided by the first power supply drops to 0W. Correspondingly, the load device may acquire the fault status of the first power supply and boost the second output power PSU2_I provided by the second power supply to be equal to the total load Load_I, that is, 1000 W.

Figure 6:
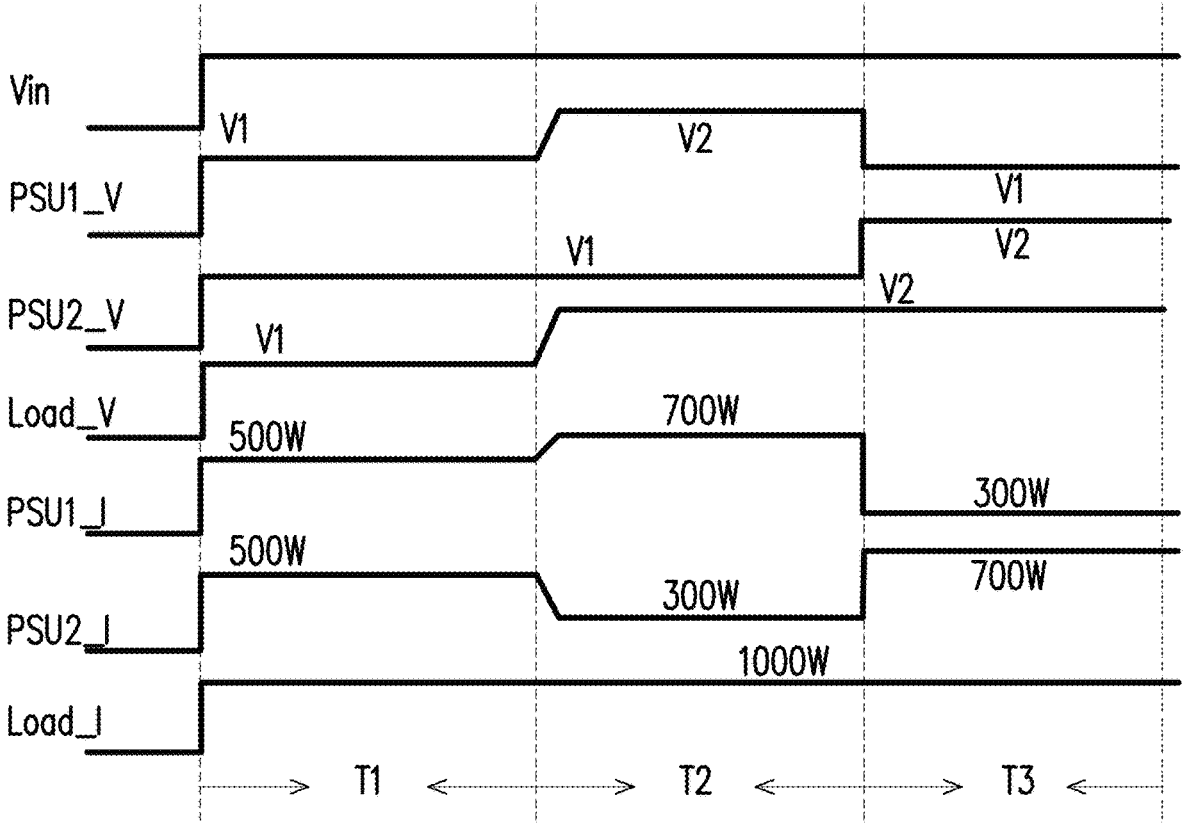
FIG. 6 shows a voltage timing diagram of a power supply of a server system according to an embodiment of the present disclosure.

Please refer to FIG. 6. FIG. 6 is a voltage timing diagram of the power supply of the server system according to an embodiment of the present disclosure. The server system of this embodiment includes a load device and a power supply device. The power supply device further includes a first power supply and a second power supply.

During the time interval from T1 to T3, the input voltage Vin is stably maintained at a positive voltage value. In the time interval T1, in the normal mode, according to the command sent by the load device, the first power supply is set as the master power supply, and the second power supply is set as the slave power supply. The output voltage PSU1_V of the first power supply, the output voltage PSU2_V of the second power supply, and the output voltage Load_V of the power supply device are all first voltage values greater than zero. Similarly, the total load Load_I required by the load device is set to be 1000 watts (W) as an example, the first output power PSU1_I provided by the first power supply and the second output power PSU2_I provided by the second power supply are both 500 W.

During the time interval T2, in the backup mode, the first power supply boosts the voltage PSU1_V from the first voltage to the second voltage. Correspondingly, the output voltage Load_V of the power supply device boosts from the first voltage to the second voltage. The second power supply maintains the output voltage PSU2_V at the first voltage. The first power supply boosts the output voltage PSU1_V so that the provided first output power PSU1_I may be adjusted from 500 W to 700 W. Correspondingly, the second output power PSU2_I provided by the second power supply may be reduced to the difference between the total load Load_I and the first output power, that is, 300 W.

In the time interval T3, according to the command sent by the load device, the first power supply is switched to the slave power supply, and the second power supply is switched to the master power supply. Therefore, the output voltage PSU1_V of the first power supply may decrease from the second voltage to the first voltage, and the output voltage PSU2_V of the second power supply may boost from the first voltage to the second voltage. If the total load Load_I is maintained at 1000 W, the output power PSU2_I of the second power supply may be boosted to 700 W according to the power setting value, and the output power PSU1_I of the first power supply may be correspondingly reduced to the difference between the total load Load_I and the second output power PSU2_I, that is, 300 W.

It is worth noting that the above-mentioned output power values are only examples for illustration and are not intended to limit the implementation of the present disclosure. The total load and power setting values may be changed according to actual needs, and there are no fixed restrictions.

Figure 7:
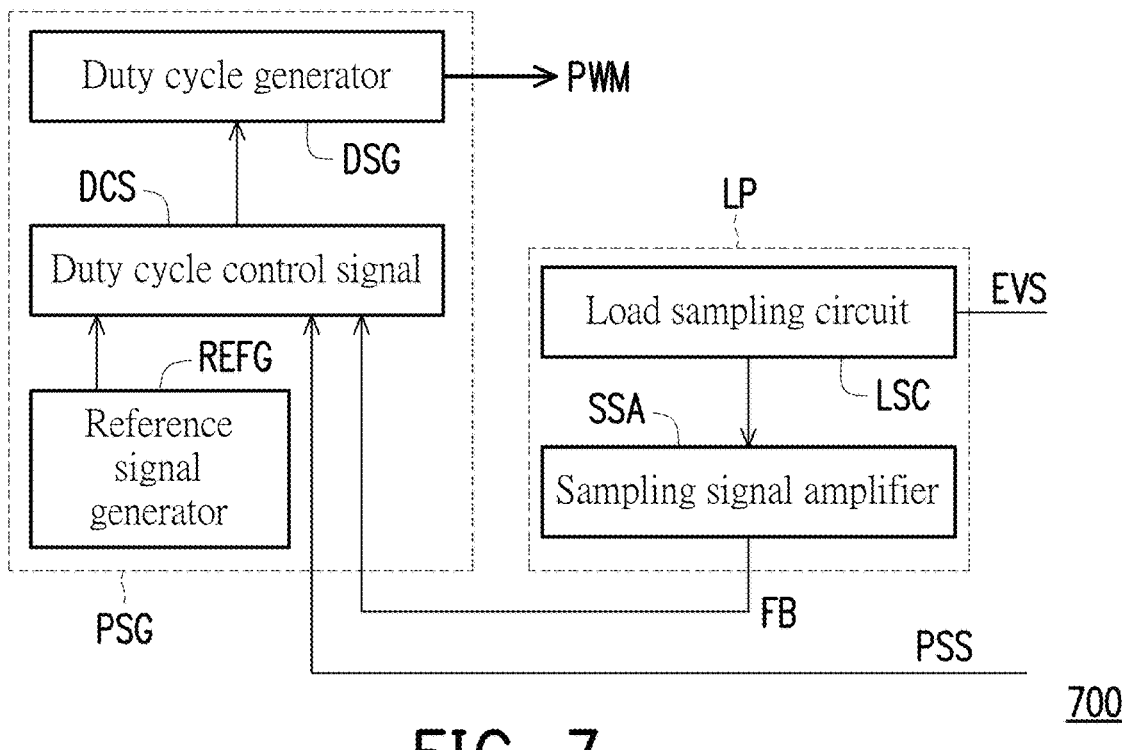
FIG. 7 is a schematic diagram of an internal circuit of a pulse width modulation signal generator of the power supply of FIG. 2.

Please refer to FIG. 7. FIG. 7 is a schematic circuit diagram of a pulse width modulation signal generator of a power supply in a server system according to an embodiment of the present disclosure. The pulse width modulation signal generator 700 of FIG. 7 may correspond to the pulse width modulation signal generators PWM_SG1 and PWM_SG2 of FIG. 2. The pulse width modulation signal generator 700 includes a periodic signal generating circuit PSG and a feedback circuit LP. The periodic signal generating circuit PSG includes a duty cycle generator DSG and a reference signal generator REFG. The feedback circuit LP includes the load sampling circuit LSC and the sampling amplifier SSA.

In terms of operation details, the load sampling circuit LSC may sense the external voltage signal EVS to sample the load device. The sampling amplifier SSA may receive the sampling signal from the load sampling circuit LSC and amplify the sampling signal to generate the feedback signal FB. The periodic signal generating circuit PSG may receive the feedback signal FB and the power setting signal PSS, and generate the duty cycle control signal DCS according to the reference voltage level of the reference signal generator REFG. The duty cycle generator DSG may adjust the pulse width modulation signal PWM according to the duty cycle control signal DCS.

Figure 8:
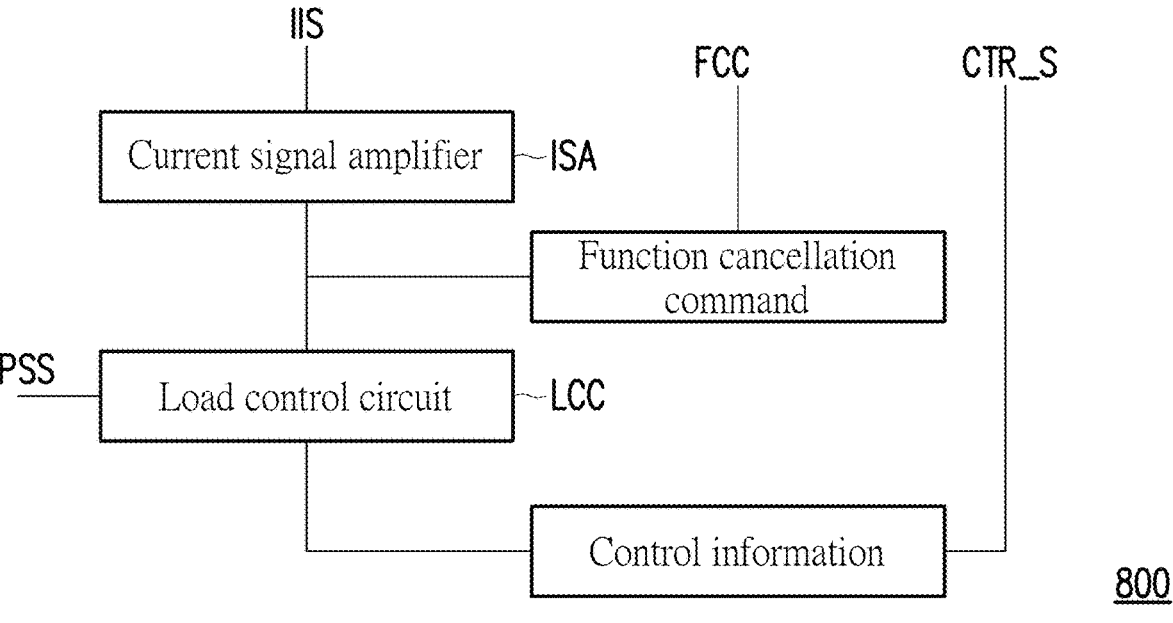
FIG. 8 is a schematic diagram of an internal circuit of a power setting circuit of the power supply of FIG. 2.

Please refer to FIG. 8. FIG. 8 is a schematic circuit diagram of a power setting circuit of a power supply in a server system according to an embodiment of the present disclosure. The power setting circuit 800 of FIG. 8 may correspond to the power setting circuits PST1 and PST2 of FIG. 2. The power setting circuit 800 includes a current signal amplifier ISA and a load control circuit LCC.

In terms of operation details, the current signal amplifier ISA may receive and amplify the internal current signal IIS. The load control circuit LCC may be a comparator, wherein the load control circuit LCC may receive the control information CTR_S from the digital signal processing circuit of the power supply, compare the control information CTR_S with the amplified internal current signal IIS, and output the power setting signal PSS. If the control information CTR_S is greater than the amplified internal current signal IIS, it means that there is still room for improvement in the working cycle of the power supply. If the control information CTR_S is less than or equal to the amplified internal current signal IIS, it means that the working cycle of the power supply needs to be reduced.

In addition, the load control circuit LCC may receive the function cancellation command FCC from the digital signal processing circuit of the power supply. If the load control circuit LCC receives the function cancellation command FCC, the load control circuit LCC will output a stop signal, so that the working cycle of the power supply becomes providing a relative value of fifty percent of the total load output power, and therefore the server system in FIG. 2 switches to the normal mode, that is, the output power of all power supplies becomes fifty percent of the total load output power of the power supply device 210.

To sum up, the master power supply and the slave power supply in the server system of the present disclosure may adjust the ratio of output to be borne by the two power supplies according to the actual condition of power supply, so that there are a variety of power supply modes for selection.

What is claimed is:

1. A power management method adaptable for a power supply device, comprising:

in a backup mode, making a first power supply that is a master power supply to receive a power setting value and limiting a first output power value of the master power supply to not be greater than the power setting value; and in the backup mode, making a second power supply that is a slave power supply to be activated, and controlling an output power of the slave power supply to be a second output power value, wherein the second output power value is set according to a difference between a total load of the power supply device and the first output power value;

generating, by a controller corresponding to each of the first power supply and the second power supply respectively, a power setting signal based on the power setting value, an internal current signal of the first power supply or the second power supply respectively, an external current signal of the power supply device, and an external voltage signal of the power supply device;

receiving, by a power generator respectively corresponding to the first power supply and the second power supply, an input voltage and generating an internal output voltage according to a corresponding pulse width modulation signal; and adjusting a pulse width modulation signal generator, which respectively corresponds to the first power supply and the second power supply and is coupled to the corresponding power generator and the corresponding controller, according to the corresponding power setting signal.

2. The power management method according to claim 1, further comprising:

when the power setting value is greater than the total load, making the slave power supply to be turned off.

3. The power management method according to claim 1, further comprising:

adjusting the first output power value of the master power supply by adjusting an output voltage of the master power supply.

4. The power management method according to claim 1, further comprising:

when the master power supply fails, boosting the second output power value of the slave power supply to be equal to the total load of the power supply device.

5. The power management method according to claim 1, further comprising:

in a normal mode, making both the first output power value of the master power supply and the second output power value of the slave power supply to be half of the total load of the power supply device.

6. The power management method according to claim 1, further comprising:

switching the first power supply to be the slave power supply, and switching the second power supply to be the master power supply.

7. A server system, comprising:

a load device; and a power supply device coupled to the load device, and comprising:

a first power supply set as a master power supply; and a second power supply set as a slave power supply and coupled in parallel with the first power supply, wherein, in a backup mode, the load device provides a power setting value to the master power supply, a first output power value provided by the master power supply is not greater than the power setting value, the load device sets a second output power value provided by the power supply device according to a difference between a total load of the power supply device and the first output power value, wherein each of the first power supply and the second power supply respectively comprising:

a controller generating a power setting signal based on the power setting value, an internal current signal of the first power supply or the second power supply respectively, an external current signal of the power supply device, and an external voltage signal of the power supply device;

a power generator receiving an input voltage and generating an internal output voltage according to a corresponding pulse width modulation signal; and a pulse width modulation signal generator coupled to the corresponding power generator and the corresponding controller, adjusting the pulse width modulation signal according to the corresponding power setting signal.

8. The server system according to claim 7, wherein when the power setting value is greater than the total load, the slave power supply is turned off.

9. The server system according to claim 7, wherein the master power supply adjusts a generated internal output voltage to adjust the first output power value provided by the master power supply.

10. The server system according to claim 7, wherein when the master power supply fails, the master power supply sends a fault signal to the load device, and the load device boosts the second output power value of the slave power supply to be equal to the total load of the power supply device according to the fault signal.

11. The server system according to claim 7, wherein in a normal mode, both the first output power value of the master power supply and the second output power value of the slave power supply are half of the total load of the power supply device.

12. The server system according to claim 7, wherein the load device sends a command to switch the first power supply to be the slave power supply, and switch the second power supply to be the master power supply.

13. The server system according to claim 7, wherein each of the first power supply and the second power supply respectively further comprises a current detector for detecting the internal current signal of the first power supply or the second power supply respectively.

14. The server system according to claim 7, wherein the controller comprises:

a digital signal processing circuit generating control information based on the power setting value, the internal current signal, the external current signal and the external voltage signal; and a power setting circuit coupled to the digital signal processing circuit, and generating the power setting signal according to the control information.

15. The server system according to claim 7, wherein the pulse width modulation signal generator comprises:

a feedback circuit receiving the external voltage signal to generate a feedback signal; and a periodic signal generating circuit coupled to the power generator, the controller and the feedback circuit, and generating the pulse width modulation signal according to the feedback signal and the power setting signal.

16. The server system according to claim 7, wherein the load device comprises:

a baseboard management controller providing the power setting value and the second output power value.

17. A power supply device, comprising:

a first power supply set as a master power supply; and a second power supply set as a slave power supply and coupled in parallel with the first power supply, wherein in a backup mode, the master power supply receives a power setting value, a first output power value of the master power supply is limited to be no greater than the power setting value, and an output power of the slave power supply is a second output power value, wherein the second output power value is set according to a difference between a total load of the power supply device and the first output power value, wherein each of the first power supply and the second power supply respectively comprises:

a controller generating a power setting signal based on the power setting value, an internal current signal of the first power supply or the second power supply respectively, an external current signal of the power supply device, and an external voltage signal of the power supply device;

a power generator receiving an input voltage and generating an internal output voltage according to a corresponding pulse width modulation signal; and a pulse width modulation signal generator coupled to the corresponding power generator and the corresponding controller, adjusting the pulse width modulation signal according to the corresponding power setting signal.

18. The power supply device according to claim 17, wherein each of the first power supply and the second power supply respectively further comprises a current detector for detecting the internal current signal of the first power supply or the second power supply respectively.

19. The power supply device according to claim 17, wherein the controller comprises:

a digital signal processing circuit generating control information based on the power setting value, the internal current signal, the external current signal and the external voltage signal; and a power setting circuit coupled to the digital signal processing circuit, and generating the power setting signal according to the control information.

20. The power supply device according to claim 17, wherein the pulse width modulation signal generator comprises:

a feedback circuit receiving the external voltage signal to generate a feedback signal; and a periodic signal generating circuit coupled to the power generator, the controller and the feedback circuit, and generating the pulse width modulation signal according to the feedback signal and the power setting signal.

21. The power supply device according to claim 20, wherein the feedback circuit comprises:

a current amplifier receiving the internal current signal and generating an amplified internal current signal; and a comparator comparing the amplified internal current signal with the power setting value to generate the feedback signal.

22. The power supply device according to claim 17, wherein when the power setting value is greater than the total load, the slave power supply is turned off;

wherein when the master power supply fails, the second output power value generated by the slave power supply is boosted to be equal to the total load of the power supply device, wherein in a normal mode, the first output power value of the master power supply and the second output power value of the slave power supply are both half of the total load of the power supply device.

* * * * *